US006889121B1

(12) United States Patent
Shahroudi et al.

(10) Patent No.: US 6,889,121 B1
(45) Date of Patent: May 3, 2005

(54) METHOD TO ADAPTIVELY CONTROL AND DERIVE THE CONTROL VOLTAGE OF SOLENOID OPERATED VALVES BASED ON THE VALVE CLOSURE POINT

(75) Inventors: Kamran Eftekhari Shahroudi, Fort Collins, CO (US); David J. Peterson, Fort Collins, CO (US); Dennis L. Belt, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

(21) Appl. No.: 10/794,389

(22) Filed: Mar. 5, 2004

(51) Int. Cl.[7] ........................ G05D 7/00; F16K 31/02

(52) U.S. Cl. ........................ 700/282; 251/129.18

(58) Field of Search .......... 251/129.04, 129.15–129.22; 700/282; 361/160, 168.1, 206

(56) References Cited

U.S. PATENT DOCUMENTS 6,397,655 B1 * 6/2002 Stephenson ................. 73/1.72
6,418,003 B1 * 7/2002 Xiang ........................ 361/172
6,560,088 B1 * 5/2003 Beck et al. ................. 361/154
6,565,064 B2 * 5/2003 Smith et al. ........... 251/129.04
2002/0134956 A1 * 9/2002 Smith et al. ........... 251/129.04
2004/0155121 A1 * 8/2004 Watanabe et al. ........ 239/533.2

* cited by examiner

*Primary Examiner*—Maria N. Von Buhr
(74) *Attorney, Agent, or Firm*—Leydig, Voit & Mayer, Ltd.

(57) ABSTRACT

The invention provides a computer implemented method to automate the calibration of the drive voltage waveform of a solenoid operated valve. An initial estimate of valve electromagnetic parameters and valve closure point is derived and the drive voltage waveform is created based in part on circuit constraints and the parameters and valve closure point. The drive voltage waveform is applied to the valve coil and the coil current feedback is obtained and used to update the initial estimate. This process is repeated until the coil current feedback meets predetermined criteria. The electromagnetic parameters include the L/R ratio of the valve during the pull-in time and decay time, the valve back emf during the pull-hold time, and the average resistance during hold when current is steady. The closure point is used to anchor the drive voltage waveform and is adjusted at a slower rate than the other parameters.

34 Claims, 7 Drawing Sheets

METHOD TO ADAPTIVELY CONTROL AND DERIVE THE CONTROL VOLTAGE OF SOLENOID OPERATED VALVES BASED ON THE VALVE CLOSURE POINT

FIELD OF THE INVENTION

This invention pertains to controlling valves, and more particularly, to detecting and controlling the closure point of solenoid operated valves.

BACKGROUND OF THE INVENTION

Solenoid operated valves and pumps are driven in their simplest form by a coil and an armature that is free to move within the coil. The armature is normally spring loaded away from the energized position such that when a power pulse is applied to the coil, the armature is pulled into the energized position and in moving opens or closes the valve. It is known that once the solenoid has moved to the end of its operating stroke, no further work is done by the armature.

The amount of current flow through the coil determines the strength of the magnetic field acting upon the armature and the voltage applied to the coil determines the current flow through the coil. The duration of voltage application to the coil must be sufficiently long in order to permit the armature to complete its operating stroke. After the operating stroke has been completed, the current through the coil can be reduced to the amount of current necessary to hold the armature in place. This current is called the hold current. Current in excess of the hold current wastes power and reduces valve life.

In order to efficiently control the solenoid, the voltage waveform to drive the coil (i.e., a drive voltage waveform) is typically selected to provide sufficient power to drive the solenoid efficiently. The prior art requires extensive manual calibration and testing in order to find and tune a 'suitable' or optimum drive voltage waveform for a particular valve. In other words, 'plug and play' of the valves is not feasible. This is due to several reasons.

One reason is that the drive voltage may be fixed in operation. When the drive voltage is fixed in operation, the drive is in principle sub-optimal in operation because there is unit-to-unit variation of the valve electromagnetic and mechanical parameters.

Another reason is that there is also a very strong type-to-type variation. For example, the pull time, pull current, hold current and closure point can be significantly different between different manufacturer's valve for the same application. The prior art does not allow a simple replacement of one type for another without repeating the extensive manual calibration. For example, one cannot simply remove a valve manufactured by a valve manufacturer and install a valve manufactured by another valve manufacturer and vice-versa without repeating the manual calibration step.

Another reason is that the closure point detection (i.e., detecting when the solenoid closes) information from prior systems is not reliable. In these systems, a numerical algorithm detects closure by finding an inflection point in the current feedback from the coil. The current feedback signal typically exhibits several 'non-linearities' (e.g., inflections). In order to differentiate these from the closure point, the drive signal is compromised and the search window used to find the closure point has to be very narrowly defined. Additionally, finding inflections in a signal is very sensitive to noise. As a result, this technique is sensitive to cycle-to-cycle variation and unit-to-unit variation.

BRIEF SUMMARY OF THE INVENTION

The invention provides a computer implemented method to automate the calibration of the drive voltage waveform of a solenoid operated valve and adaptively control the drive voltage waveform of the solenoid coil and detect the closure point of the valve. An initial estimate of valve electromagnetic parameters and the valve closure point is derived and the drive voltage waveform is created based in part on circuit constraints and the parameters and valve closure point. The drive voltage waveform is applied to the valve coil and the coil current feedback is obtained and used to update the initial estimate. This process is repeated until the coil current feedback meets predetermined criteria. The electromagnetic parameters include the L/R ratio of the valve during the pull-in time and decay time, the valve back emf during the pull-hold time, and the average resistance during hold when current is steady. The closure point is used to anchor the drive voltage waveform and is adjusted at a slower rate than the other parameters.

During operation, the voltage waveform is adaptively adjusted to changing conditions by analyzing the coil current feedback and adjusting the drive voltage waveform accordingly and at a slower rate than during the initial calibration of the valve that determines the drive voltage waveform to be used. Adaptation of parameters is stopped if control pulses of the valve are such that the parameters (and closure point) cannot be derived.

Trends or patterns in the electromagnetic parameters and the closure point are used in one embodiment to determine the condition of the valve. Other aspects, objectives and advantages of the invention will become more apparent from the following detailed description when taken in conjunction with the accompanying drawings.

DETAILED DESCRIPTION OF THE INVENTION

Figure 1:
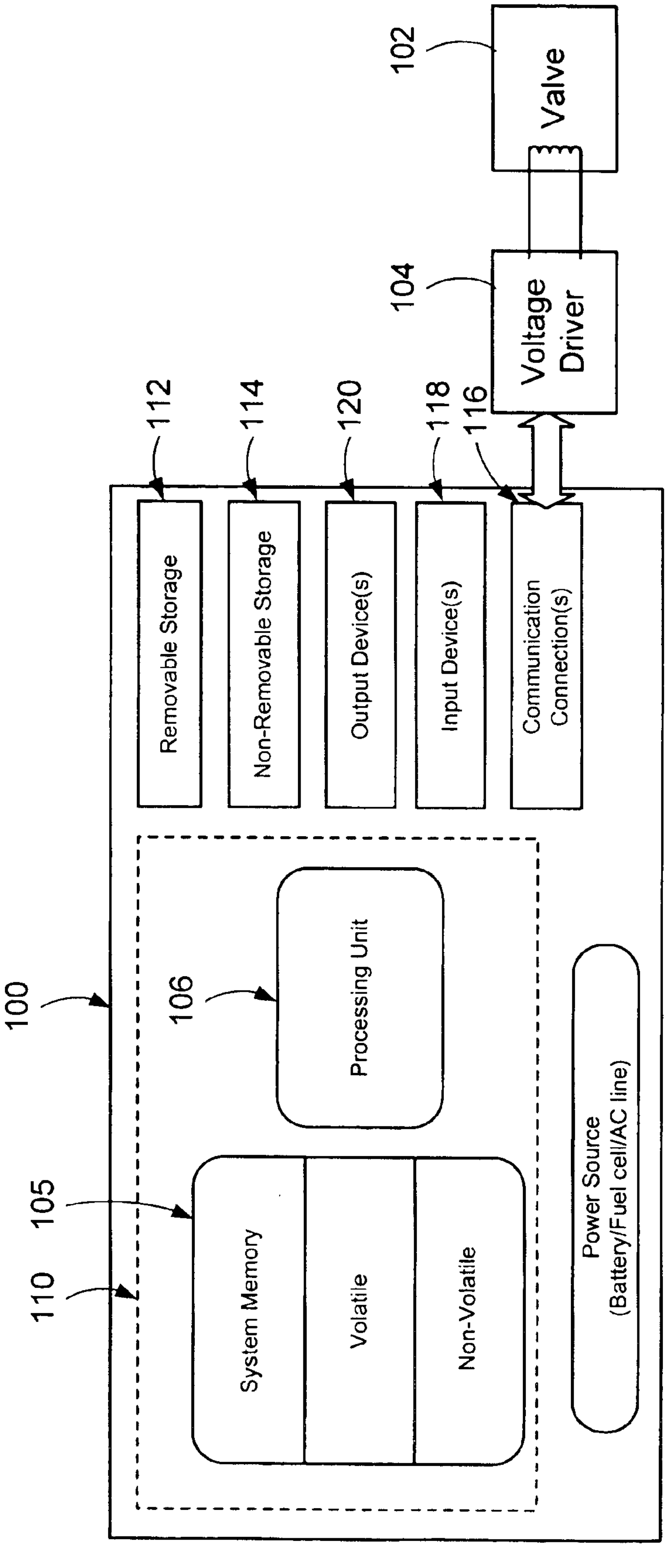
FIG. 1 is a block diagram generally illustrating an exemplary operation environment in which an embodiment of the invention may be implemented.

The present invention utilizes adaptive control and optimization to automate the calibration of a valve with respect to determine and tune the optimum drive voltage for a particular valve. Unlike prior art systems that find an inflection point in the coil current feedback, the invention controls the drive voltage such that the closure point of the valve corresponds to a minimum point of a "notch" in the coil current feedback. The invention reliably and repeatedly detects and controls the closure point of valves regardless of the type of valve, unit-to-unit variation, and operational variation between valves. In one embodiment, the closure point is controlled such that the lowest allowable current level to operate the valve is used. This reduces the system's power supply requirements, reduces heat generated in the valve coil drive circuitry and helps extend the life of the valves and valve controller.

Prior to describing the invention in detail, an exemplary system in which the invention may be implemented is first described with reference to FIG. 1. Turning to the drawings, wherein like reference numerals refer to like elements, the invention is illustrated as being implemented in a suitable environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 shows an exemplary computing device 100 communicating with a valve 102 via voltage driver 104 for implementing an embodiment of the invention. Alternatively, the voltage driver 104 and valve 102 may be isolated from the computing device 100 and data manually entered into the computing device 100. The valve 102 and voltage driver 104 are well known in the art and need not be described in detail herein. In its most basic configuration, the computing device 100 includes at least a processing unit 106 and a memory 108. Depending on the exact configuration and type of computing device, the memory 108 may be volatile (such as RAM), non-volatile (such as ROM, flash memory, etc.) or some combination of the two. This most basic configuration is illustrated in FIG. 1 by a dashed line 110. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 112 and a non-removable storage 114. Computer storage media includes volatile and nonvolatile, removable and non-removable media implemented in any method or technology for storage of information such as computer readable instructions, data structures, program modules or other data. The memory 108, the removable storage 112 and the non-removable storage 116 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

The device 100 may also contain one or more communications connections 116 that allow the device to communicate with other devices. The communications connections 116 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 may also have one or more input devices 118 such as keyboard, mouse, pen, voice input device, touch-input device, etc. One or more output devices 120 such as a display, speakers, printer, etc. may also be included. All these devices are well known in the art and need not be discussed at greater length here.

Figure 2:
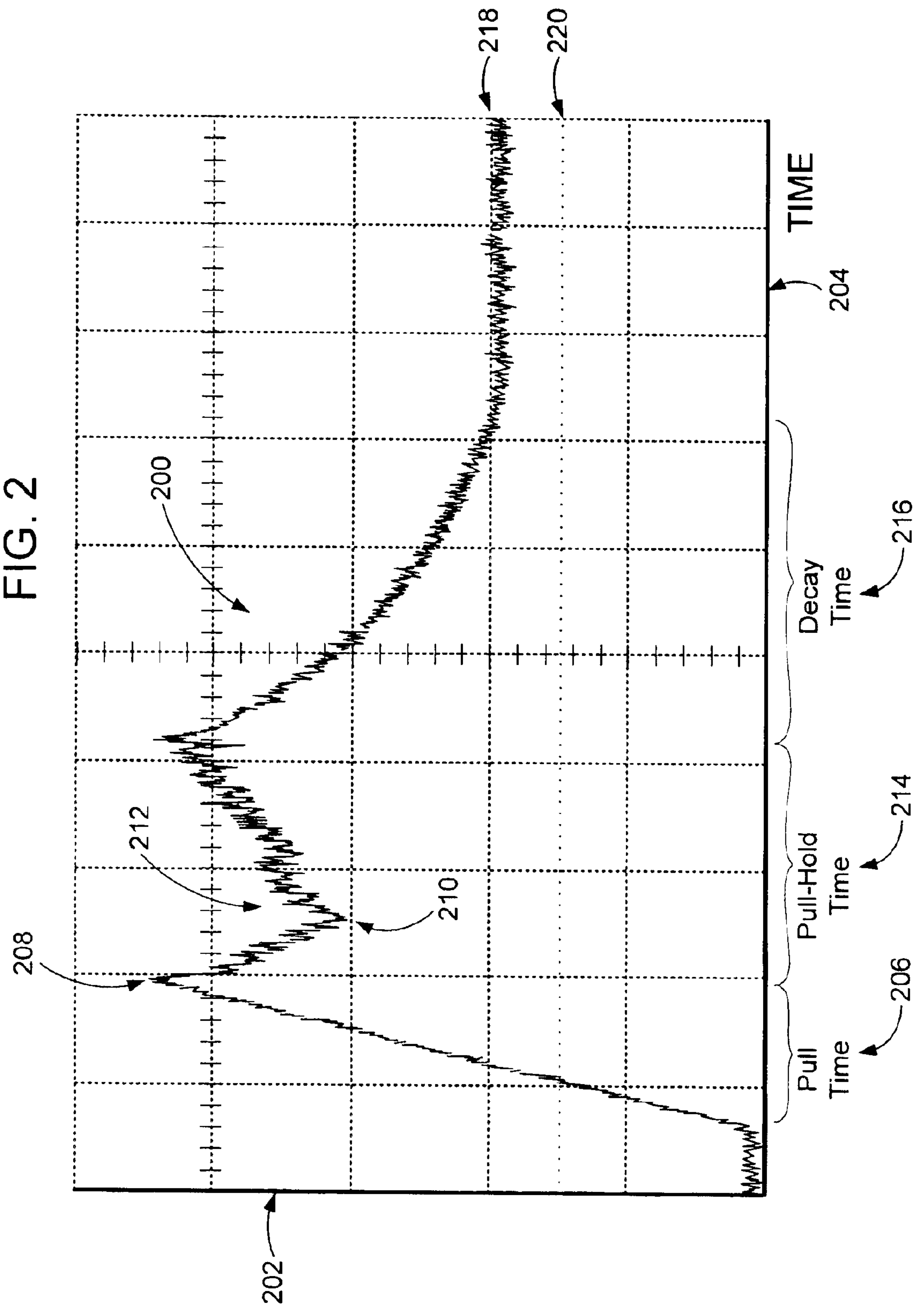
FIG. 2 is a diagram illustrating an exemplary converged current waveform in accordance with the teachings of the present invention.

Turning now to FIG. 2, an example of a current waveform driven by a drive voltage derived in accordance with the invention for a valve is shown. The ordinate axis 202 is current magnitude and the abscissa axis 204 is time. The pull-time 206 is the time in which current in the valve coil rises to a first peak 208. This current is called the pull current and the current rises linearly during this time. Controlling the valve with drive voltage makes the closure point correspond to a minimum point 210 of a "notch" 212 in the current waveform. When closure occurs during the pull-hold time 214, the largest non-linearity in the pull-hold window 214 is due to a sudden decrease in the back emf (BEMF) that corresponds to valve closure. In other words, it is possible to get local minima due to other non-linearities, but the largest dip or the smallest minimum is due to closure of the valve. If the closure point information is reliable (i.e. no significant variation), then it can be used to anchor the drive voltage (e.g., it can be used as a datum to define an optimum drive voltage). Both the time value and current value of the closure point is used to determine the drive voltage. Once the pull-hold time passes, the current decays (this time is called the decay time 216) until is reaches a current value 218 that is sufficiently above the valve hold current 220 to prevent the valve from prematurely opening.

Figure 3:
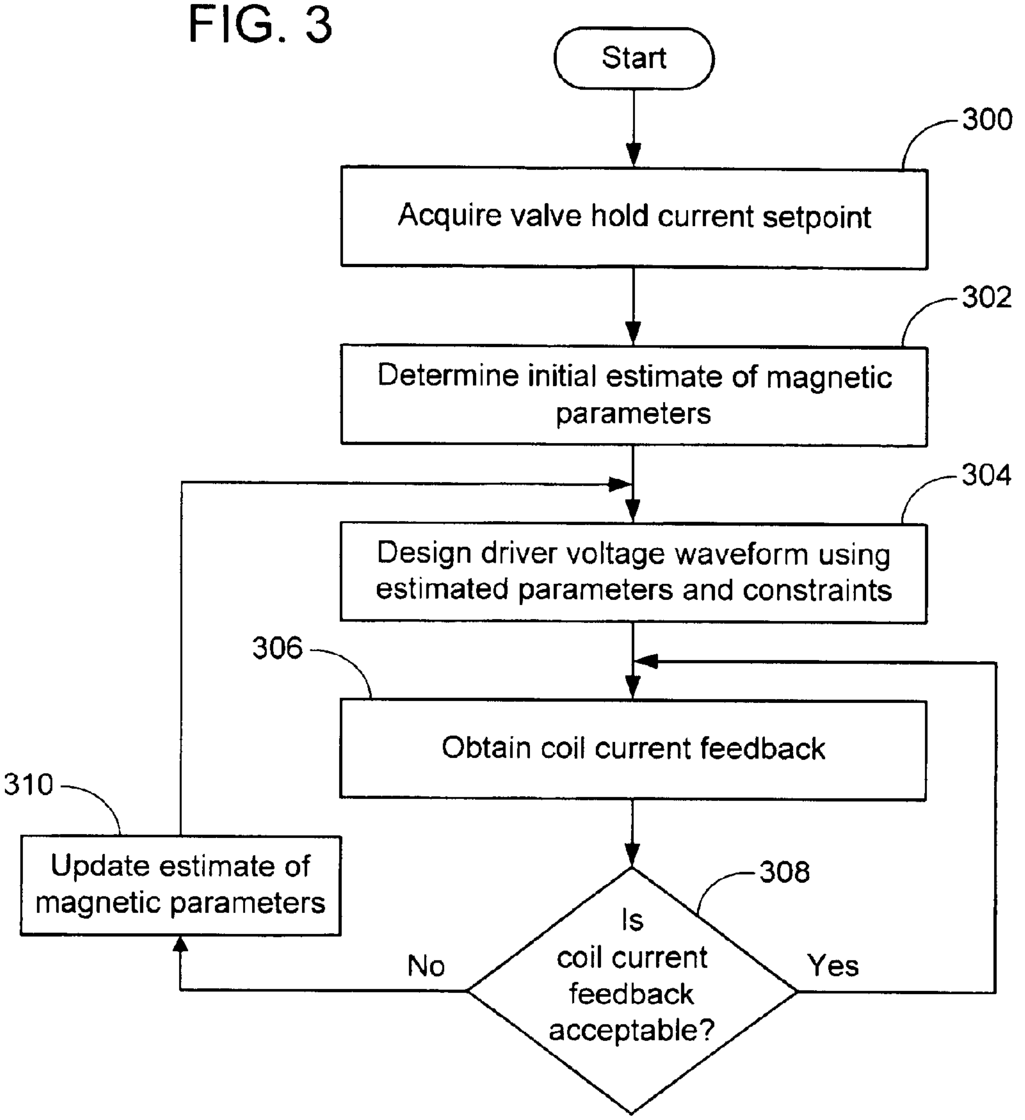
FIG. 3 is a flowchart showing the steps for deriving a drive voltage waveform to produce the current waveform of FIG. 2.

Turning now to FIG. 3, the steps taken to derive and adapt the drive voltage (i.e., the control voltage) for the valve are shown. To derive the control voltage for a valve, four electromagnetic parameters of the valve are needed. These are the L/R ratio (inductance/resistance ratio of the valve coil) during the pull-in time of the valve coil (designated as L/R1), the back emf (BEMF) of the valve during the pull-hold time, the L/R ratio of the valve coil during the decay time (designated as L/R2), and the average resistance during hold (i.e., a hold resistance) when current is steady (e.g., current value 216). Other parameters may also be used to derive the voltage waveform.

The valve holding current is acquired (step 300). This is a known parameter of the valve and is based upon valve size and valve magnetic parameters. An initial estimate of the four electromagnetic parameters and closure point (hereafter, collectively called "the parameters) is determined (step 302). The initial estimates may be guessed or be based upon similar valve designs. For example, parameters for similar devices could be stored in a database and these stored parameters could be used as the initial estimate of the parameters. The initial estimate can also be determined by defining a standard very low energy starting voltage waveform. This approach is used when very little or nothing is known about the valve. The resulting coil current feedback is used to derive the four parameters and closure point. While using a very low energy starting voltage waveform will not produce a satisfactory result initially, the method described herein reaches a satisfactory result after a number of iterations.

Once the initial estimate is determined, a voltage drive waveform is derived based on circuit constraints and the estimated parameters and closure point (step 304). The circuit constraints may include maximum driver current, voltage limits, slew rate (i.e., voltage and/or current rise times) (to reduce electromagnetic interference), and the like.

The derived voltage waveform is tested on the valve coil and the coil current feedback is obtained (step 306). The coil current is analyzed to determine if the drive voltage waveform is acceptable (step 308). The analysis includes determining the time and current value of the parameters (i.e., closure point and electromagnetic parameters). For example, the R value is determined by looking at the tail end of the coil current feedback where this is no significant dI/dt and solving R from V=IR where V is the magnitude of the drive voltage and I is the current. L/R1 is determined by solving dI/dt=(V−IR)/L during the current rise time. L/R2 is determined similarly by looking at the current decay from the pull current value to the hold current value. The BEMF is the average extra voltage required to return the current to the same pull current value before decay starts.

The drive voltage waveform and current feedback are compared to previously acquired waveforms for the valve (or stored waveforms for similar valves) and the parameters are adjusted accordingly. If the parameters need to be adjusted, the estimate of the parameters is updated (step 310) from the coil current feedback and voltage waveform as described above. The process of steps 304–310 is repeated until the coil current feedback meets predetermined criteria. The criteria may include the closure point not having a significant variation from shot to shot, the area under the current curve is minimized to reduce power dissipation in the coil, etc. In one embodiment, if the coil current feedback is acceptable, the drive voltage waveform is applied to the coil for a predetermined number of times to verify that the drive voltage waveform consistently results in a desired coil current feedback.

In the steps described above, there are two types of basic adaptation that are taking place. The first type is the adaptation of the four electromagnetic parameters. An adjustment of these electromagnetic parameters results in a change in the drive voltage levels. The second type is the adaptation of the closure point. Since this is used an anchor in the drive voltage waveform, an adjustment in the closure point results in a change in the time values that define the drive voltage windows (e.g., pull time, pull-hold time, etc.). In principle, the two adaptations above form an algebraic loop. For example, a change in the electromagnetic parameters causes a change in the closure point that in turn causes a bigger change in the parameters, and so on. This potential problem is resolved by forcing the closure point adaptation to occur at a much lower frequency than the parametric adaptation so that they do not adversely interfere with each other. Additionally, knowledge of the parameters provides an information link between the time values, the drive voltage, and current levels. This information is used in feed forward fashion to reduce the degree of the algebraic loop.

Figure 4:
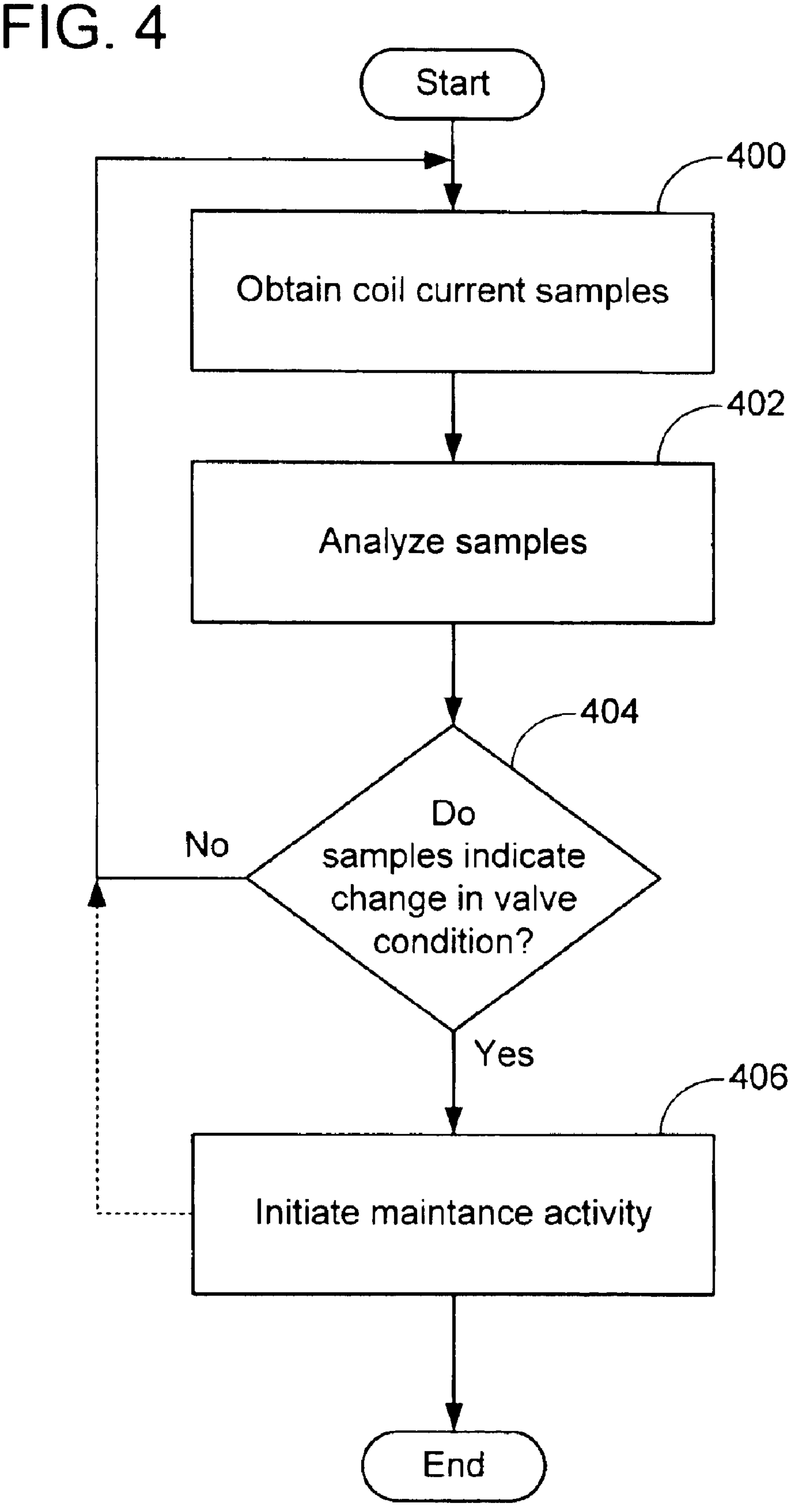
FIG. 4 is a flowchart showing the steps for adapting the drive voltage waveform during operation of a valve in accordance with the teachings of the present invention.

Once the voltage waveform has been derived, the coil current feedback is monitored and the voltage waveform is adjusted during valve operation to optimize the coil current feedback. Turning now to FIG. 4, the coil current feedback is sampled during operation (step 400). The samples are analyzed as described above (step 402). A determination is made of whether the drive voltage waveform needs to be changed (step 404). If the samples indicate no change in the drive voltage waveform is needed, steps 400–404 are repeated. If the samples indicate that a change in the drive voltage waveform is needed, the process enters into a maintenance mode (step 406). In the maintenance mode, a determination is made as to whether the drive voltage waveform should be adjusted and/or maintenance activity signaled. Trends or patterns in the electromagnetic parameters and the closure point contain information about the condition of the valve. For example, a gradual fouling of a sticky valve can be diagnosed and predicted in advance by the change in parameters and an indication can be provided of the condition to a system controller and/or a visual indication can be provided. Prediction of valve failure and preventive maintenance (e.g., prognostics) can be performed by comparing the current feedback of valves and the calculated valve parameters (e.g., the electromagnetic parameters) to other valves in an engine. For example, if a valve's parameters begin to change at a faster rate than other valves, the valve can be checked to determine if the valve should be replaced. If the drive voltage waveform needs to be adjusted, steps 304 to 310 are repeated.

In practice, the rate of adaptation of the parameters (and the drive voltage waveform) should be controlled to suit a particular mode of the engine or activity. For example, during the initial calibration, a high convergence rate is recommended. However, during run time, the convergence rate has to be low so that no unwanted adaptation takes place during unusual or abrupt changes to the engine. There are also situations where the adaptation has to be switched off for events, including when the injection event is cancelled during a maintenance or monitoring activity. For example, if the engine controller requests a very short injection pulse which is shorter than the time necessary to decay the current to the hold value, the R and L/R2 adaptation is disabled. If the required pulse is so short that it cuts into the closure window, then BEMF and closure point adaptation are disabled. If the closure point can't be detected during normal operation (i.e., during the time of a normal valve closure), the system user is alerted of a possible valve failure.

The overall steps have been described. Returning now to FIG. 2, an actual converged waveform during a bench test on an ERV (electronic rail valve) is shown. It can be seen that the closure point is within the pull-hold window 214 and is at the minimum current value in the pull-hold window 214. The converged waveform may be different for other valve types and units of valves. The invention finds the optimum current waveform for the pull-time 206, pull-hold time 214, decay time 216 and the optimum values for the first peak 208, the closure point (i.e., minimum point 210), "notch" 212, and current value 218 using the techniques described herein.

Figure 5:
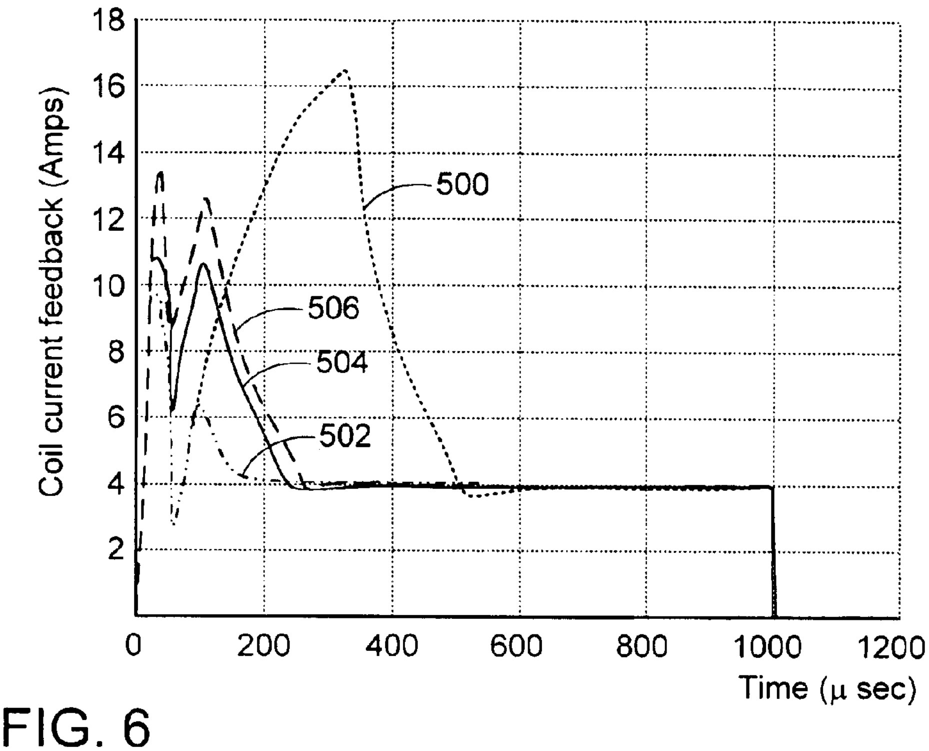
FIG. 5 illustrates how the present invention converges the current feedback trace to a final state in accordance with the teachings of the present invention.

FIG. 5 shows how the current feedback trace converges from its initial state 500 to its final state 506 using the procedure described above. Intermediate states are represented by curves 502 and 504. Any number of intermediate states may be needed for convergence. The procedure purposely causes a notch (e.g., notch 212) that corresponds to the closure point and never loses track of it. The closure point value is the location in time corresponding to the minimum point of the notch.

Figure 6:
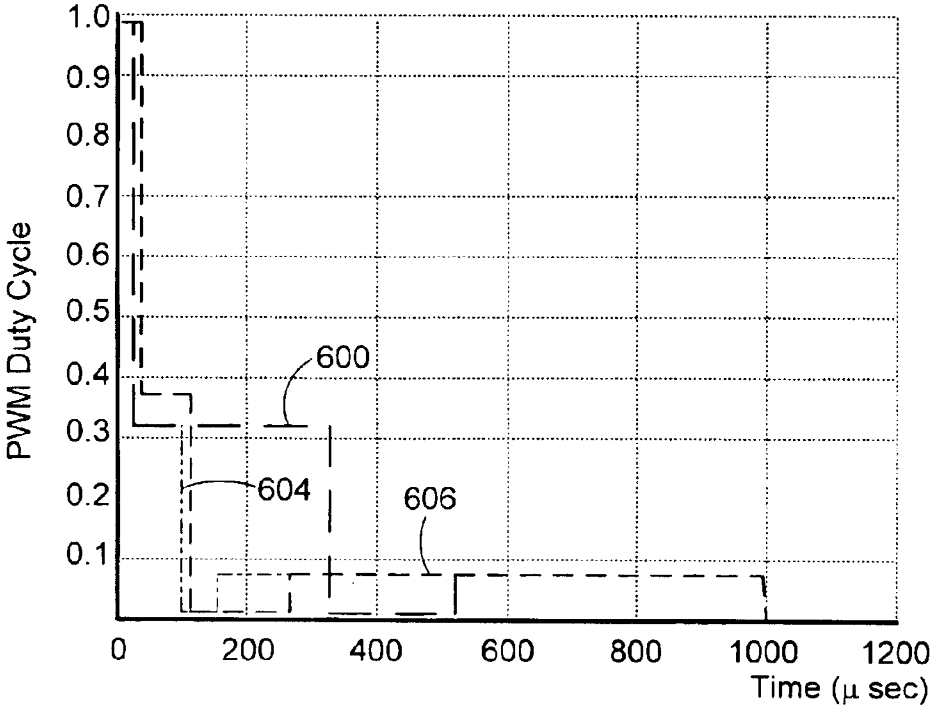
FIG. 6 illustrates how the duty cycle of the drive voltage waveform changes from an initial state to a final state.

It should be noted that the power source does not have to be a stiff source for the invention to work. The invention accounts for any change in the voltage level (e.g., supply voltage sagging as a result of current being drawn) by lumping source characteristics in the electromagnetic parameters. For example, the derivation of the L/R1 constant accounts for the change in voltage during the pull-time. FIG. 6 shows how the corresponding duty cycle of the drive voltage waveform changes with iterations. Note that the initial state 600 and final state 606 are different. An intermediate state 604 is also shown. The initial state 600 corresponds to curve 500, intermediate state 604 corresponds to curve 504, and the final state 606 corresponds to curve 506. The intermediate state 606 overlays the initial state 600 for a portion of the time from the start (time=0 $\mu$sec) until it drops to zero. It also overlays the final state 606 as shown until the end of the cycle. The drive voltage waveform tracks the duty cycle. For example, if the power source is a stiff source, the average voltage delivered to the valve coil is the duty cycle times the power source output voltage level. Those skilled in the art will recognize that any type of PWM (Pulse width modulation) control may be used. PWM control is known in the art and need not be discussed herein.

Figure 7:
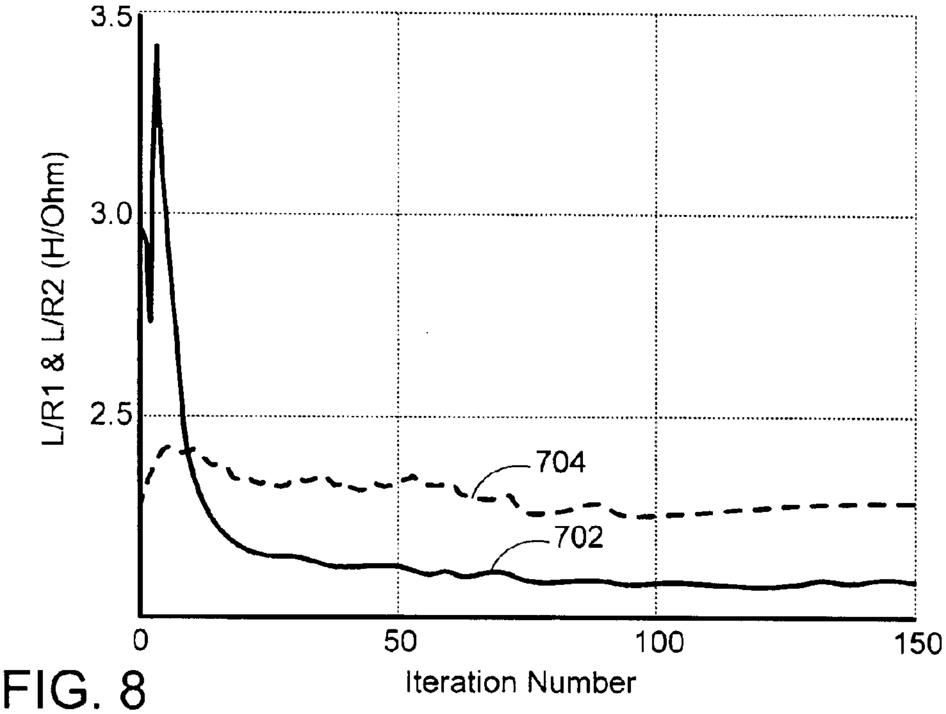
FIG. 7 illustrates how the L/R constants of the pull-time window and the decay time window converge in accordance with the teachings of the present invention.
Figure 8:
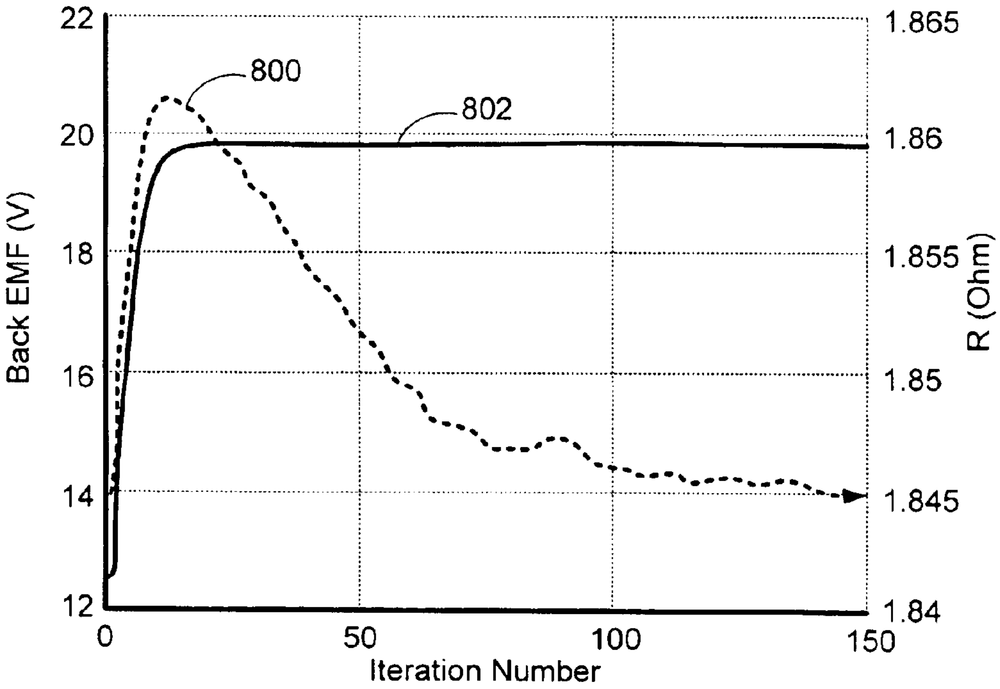
FIG. 8 illustrates how the back EMF and hold resistance R converge in accordance with the teachings of the present invention.
Figure 9:
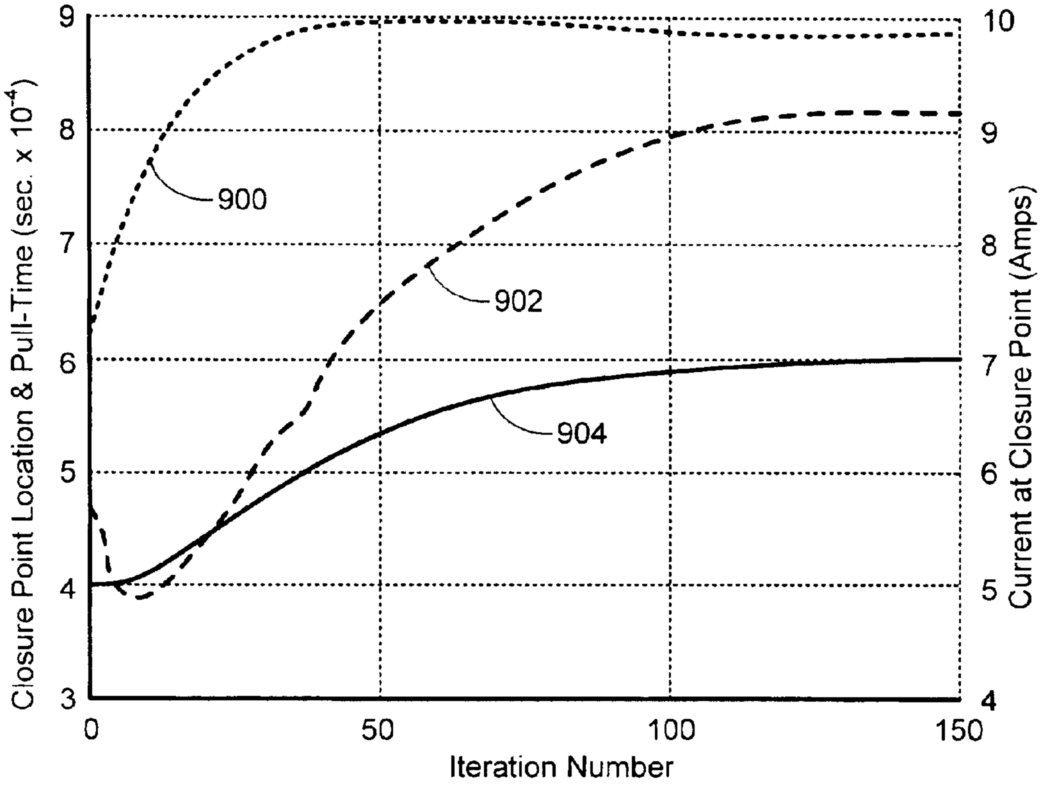
FIG. 9 illustrates how the closure point, pull-time, and minimum current during the pull-hold time move during the convergence of the parameters in accordance with the teachings of the present invention.

FIGS. 7 and 8 illustrates the convergence of the basic four parameters. FIG. 7 illustrates the convergence of L/R1 (curve 700) and L/R2 (curve 702). FIG. 8 illustrates the convergence of the back EMF (curve 800) and the average resistance (R) during hold (curve 802). The adaptations are initially large and then reach equilibrium. Note that the adaptations of these parameters are the high frequency adaptations previously described, as opposed to the low frequency adaptations that are related to the movement of the closure point in time and in current as shown in FIG. 9. The L/R1 and L/R2 values converge to different values even though there is only one valve coil and one resistance. The reason for this is that the coils typically exhibit non-linearity and the current rise during pull time 206 is not necessarily controlled by the same average characteristic parameters than the current fall during decay 216. L/R is used rather than L in order to decouple any disturbance that might come from R adaptation on the rise and fall time constant.

FIG. 9 shows how the closure point location in time and in current is moved during the search for the optimum drive voltage. Curve 900 is the closure point location, curve 902 is the current at the closure point, and curve 904 is the pull-time. It can be seen that the curves are smooth and stable and that the adaptation occurs at a low frequency as described above. If the closure point moves in time during operation, the controller can bias the injection timing to adjust for this movement and precisely control when fuel is injected.

It can be seen from the foregoing description that a method to reliably and repeatedly detect and control the closure point of valves regardless of the type of valve, unit-to-unit variation, and operational variation between valves has been described. Closure point is reliably and repeatedly detected and controlled, which results in the coil current and closure point time being controlled to optimum values.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer implemented method for deriving a drive voltage waveform for a solenoid operated valve having a valve coil comprising the steps of:

a) determining an initial estimate of electromagnetic parameters and a valve closure point, the electromagnetic parameters including a first L/R ratio corresponding to the pull-in time of the valve coil, a valve back emf, a second L/R ratio corresponding to the valve pull-hold time, and a hold resistance;

b) deriving a drive voltage waveform based in part on the electromagnetic parameters and the valve closure point;

c) obtaining a coil current feedback;

d) determining the electromagnetic parameters and the valve closure point from the coil current feedback, thereby creating a revised estimate of the electromagnetic parameters and the closure point;

e) updating the initial estimate with the revised estimate of the electromagnetic parameters and the valve closure point; and f) deriving a new voltage waveform based in part on the revised estimate of the electromagnetic parameters and the valve closure point.

2. The method of claim 1 further comprising the step of repeating steps c–f until predefined criteria is met.

3. The method of claim 2 wherein the predefined criteria includes the closure point not having a significant variation from waveform to waveform.

4. The method of claim 2 wherein the coil current feedback comprises a current waveform and the predefined criteria includes minimizing an area under the current waveform to reduce power dissipation in the valve coil.

5. The method of claim 1 wherein the step of determining the initial estimate of the electromagnetic parameters and the valve closure point includes the steps of:

searching a database having data comprising electromagnetic parameters and closure points for a plurality of valves for a valve similar to the solenoid operated valve; and setting the initial estimate of the electromagnetic parameters and the valve closure point to the data for the valve similar to the solenoid operated valve.

6. The method of claim 1 wherein the step of determining the initial estimate of the electromagnetic parameters and the valve closure point includes the steps of:

defining a standard voltage waveform that provides an energy that is very low when compared to other voltage waveforms;

driving the valve coil with the standard voltage waveform;

obtaining coil current feedback corresponding to the standard voltage waveform; and determining the electromagnetic parameters and the valve closure point from the coil current feedback corresponding to the standard voltage waveform.

7. The method of claim 1 wherein the step of deriving the drive voltage waveform based in part on the electromagnetic parameters and the valve closure point comprises deriving the drive voltage waveform based on circuit constraints and the electromagnetic parameters and the valve closure point.

8. The method of claim 7 wherein the circuit constraints includes at least one of a maximum driver current and a voltage limit.

9. The method of claim 8 wherein the at least one of the maximum driver and the voltage limit includes at least one of the maximum driver, the voltage limit, and slew rate.

10. The method of claim 1 further comprising the step of forcing adaptation of the closure point at a lower frequency than adaptation of the electromagnetic parameters.

11. The method of claim 1 further comprising the step of controlling a convergence rate of adaptation of the closure point and the electromagnetic parameters based in part of the mode of activity.

12. The method of claim 11 further comprising the step of controlling the convergence rate during an initial calibration of the solenoid operated valve at a higher rate than during operation of the solenoid operated valve.

13. The method of claim 11 wherein the step of controlling the convergence rate of adaptation of the closure point and the electromagnetic parameters based in part of the mode of activity includes the step of disabling adaptation of at least one of the electromagnetic parameters and closure point.

14. The method of claim 13 wherein the step of disabling adaptation of at least one of the electromagnetic parameters and closure point includes the step of disabling adaptation of at least one of the hold resistance and the second L/R ratio if an engine controller requests that the solenoid operated valve be operated with a time that is shorter than the time necessary to decay coil current to a hold value.

15. The method of claim 14 wherein the step of disabling adaptation of at least one of the electromagnetic parameters and closure point further includes the step of disabling adaptation of at least one of the closure point and the valve back emf if an engine controller requests that the solenoid operated valve be operated with a time that is shorter than the time necessary to a detect the closure point.

16. The method of claim 1 wherein the step of deriving the drive voltage waveform includes deriving a voltage waveform that results in the valve closure point occurring during a pull-hold time portion of the coil current feedback.

17. The method of claim 1 wherein the step of determining the electromagnetic parameters and the valve closure point from the coil current feedback includes the step of setting the closure point to the minimum value of the coil current feedback during a pull-hold time portion of the coil current feedback.

18. The method of claim 1 wherein steps c–f are repeated during operation of the solenoid operated valve, the method further comprising the step of determining trends in the electromagnetic parameters and the closure point.

19. The method of claim 18 further comprising the step of providing an indication if at least one of the electromagnetic parameters and the closure point indicate an abnormal condition of the solenoid operated valve.

20. A computer-readable medium having computer executable instructions for performing the steps of claim 1.

21. The computer-readable medium of claim 20 having further computer executable instructions for performing the step of repeating steps c–f until a predefined criteria is met.

22. The computer-readable medium of claim 20 wherein the step of determining the initial estimate of the electromagnetic parameters and the valve closure point includes the steps of:

searching a database having data comprising electromagnetic parameters and closure points for a plurality of valves for a valve similar to the solenoid operated valve; and setting the initial estimate of the electromagnetic parameters and the valve closure point to the data for the valve similar to the solenoid operated valve.

23. The computer-readable medium of claim 20 wherein the step of determining the initial estimate of the electromagnetic parameters and the valve closure point includes the steps of:

defining a standard voltage waveform that provides an energy that is very low when compared to other voltage waveforms;

driving the valve coil with the standard voltage waveform;

obtaining coil current feedback corresponding to the standard voltage waveform; and determining the electromagnetic parameters and the valve closure point from the coil current feedback corresponding to the standard voltage waveform.

24. The computer-readable medium of claim 20 wherein the step of deriving the drive voltage waveform based in part on the electromagnetic parameters and the valve closure point comprises deriving the drive voltage waveform based on circuit constraints and the electromagnetic parameters and the valve closure point.

25. The computer-readable medium of claim 20 further comprising the step of forcing adaptation of the closure point at a lower frequency than adaptation of the electromagnetic parameters.

26. The computer-readable medium of claim 20 having further computer executable instructions for performing the step of controlling a convergence rate of adaptation of the closure point and the electromagnetic parameters based in part of the mode of activity.

27. The computer-readable medium of claim 26 having further computer executable instructions for performing the step of controlling the convergence rate during an initial calibration of the solenoid operated valve at a higher rate than during operation of the solenoid operated valve.

28. The computer-readable medium of claim 26 wherein the step of controlling the convergence rate of adaptation of the closure point and the electromagnetic parameters based in part of the mode of activity includes the step of disabling adaptation of at least one of the electromagnetic parameters and closure point.

29. The computer-readable medium of claim 28 wherein the step of disabling adaptation of at least one of the electromagnetic parameters and closure point includes the step of disabling adaptation of at least one of the hold resistance and the second L/R ratio if an engine controller requests that the solenoid operated valve be operated with a time that is shorter than the time necessary to decay coil current to a hold value.

30. The computer-readable medium of claim 29 wherein the step of disabling adaptation of at least one of the electromagnetic parameters and closure point further includes the step of disabling adaptation of at least one of the closure point and the valve back emf if an engine controller requests that the solenoid operated valve be operated with a time that is shorter than the time necessary to a detect the closure point.

31. The computer-readable medium of claim 20 wherein the step of deriving the drive voltage waveform includes deriving a voltage waveform that results in the valve closure point occurring during a pull-hold time portion of the coil current feedback.

32. The computer-readable medium of claim 20 wherein the step of determining the electromagnetic parameters and the valve closure point from the coil current feedback includes the step of setting the closure point to the minimum value of the coil current feedback during a pull-hold time portion of the coil current feedback.

33. The computer-readable medium of claim 20 wherein steps c–f are repeated during operation of the solenoid operated valve, the method further comprising the step of determining trends in the electromagnetic parameters and the closure point.

34. The computer-readable medium of claim 33 further comprising the step of providing an indication id at least one of the electromagnetic parameters and the closure point indicate an abnormal condition of the solenoid operated valve.

* * * * *